United States Patent
Brown

(10) Patent No.: US 9,396,644 B2
(45) Date of Patent: *Jul. 19, 2016

(54) SYSTEMS AND METHODS FOR MANAGING LOST DEVICES

(71) Applicant: Certicom Corp., Mississauga (CA)

(72) Inventor: Daniel Richard L. Brown, Mississauga (CA)

(73) Assignee: Certicom Corp., Mississauga, Ontario (CA)

(*) Notice: Subject to any disclaimer, the term of this patent is extended or adjusted under 35 U.S.C. 154(b) by 0 days.

This patent is subject to a terminal disclaimer.

(21) Appl. No.: 14/459,101

(22) Filed: Aug. 13, 2014

(65) Prior Publication Data

US 2014/0354409 A1  Dec. 4, 2014

Related U.S. Application Data

(63) Continuation of application No. 12/893,552, filed on Sep. 29, 2010, now Pat. No. 8,836,510.

(51) Int. Cl.
| | |
|---|---|
| *G08B 13/14* | (2006.01) |
| *G08B 21/24* | (2006.01) |
| *G08B 5/36* | (2006.01) |
| *H04W 4/20* | (2009.01) |
| *H04W 12/12* | (2009.01) |
| *H04W 4/02* | (2009.01) |
| *H04W 8/22* | (2009.01) |

(52) U.S. Cl.
CPC *G08B 21/24* (2013.01); *G08B 5/36* (2013.01); *G08B 13/1436* (2013.01); *H04W 4/20* (2013.01); *H04W 12/12* (2013.01); *H04W 4/028* (2013.01); *H04W 8/22* (2013.01)

(58) Field of Classification Search
CPC .... G06F 21/88; G08B 21/24; G08B 13/1427; G08B 5/36; G08B 13/1436; H04W 12/12; H04W 12/06; H04W 88/02; H04W 4/20
USPC ........... 340/568.1, 571, 539.32, 691.1–691.6, 340/692, 331, 815.4, 815.45; 455/404.1, 455/404.2, 410, 411, 421
See application file for complete search history.

(56) References Cited

U.S. PATENT DOCUMENTS

| | | | |
|---|---|---|---|
| 6,662,023 | B1 | 12/2003 | Helle |
| 8,836,510 | B2* | 9/2014 | Brown .......................... 340/571 |
| 2009/0253408 | A1 | 10/2009 | Fitzgerald et al. |
| 2009/0253410 | A1 | 10/2009 | Fitzgerald et al. |

(Continued)

OTHER PUBLICATIONS

Canadian Office Action; Application No. 2,754,229; Nov. 20, 2014; 4 pages.

(Continued)

*Primary Examiner* — Thomas Mullen
(74) *Attorney, Agent, or Firm* — Conley Rose, P.C.; J. Robert Brown, Jr.

(57) ABSTRACT

A method for a device to determine that it has been lost is provided. The method comprises the device determining its current location, the device comparing its current location to a plurality of stored locations, and the device determining that it has been lost when its current location is a stored location that has been designated as a location where the device is unlikely to be located or is not a stored location that has been designated as a location where the device is likely to be located.

20 Claims, 4 Drawing Sheets

(56) References Cited

U.S. PATENT DOCUMENTS

| | | |
|---|---|---|
| 2010/0188243 A1 | 7/2010 | Tysowski et al. |
| 2010/0210240 A1 | 8/2010 | Mahaffey et al. |
| 2010/0273452 A1 | 10/2010 | Rajann et al. |
| 2011/0075835 A1 | 3/2011 | Hill |

OTHER PUBLICATIONS

Brown, Daniel Richard L., et al.; U.S. Appl. No. 12/893,552, filed Sep. 29, 2010; Title: Systems and Methods for Managing Lost Devices.

Office Action dated Jan. 29, 2013; U.S. Appl. No. 12/893,552, filed Sep. 29, 2010; 15 pages.

Final Office Action dated May 29, 2013; U.S. Appl. No. 12/893,552, filed Sep. 29, 2010; 11 pages.

Advisory Action dated Sep. 6, 2013; U.S. Appl. No. 12/893,552, filed Sep. 29, 2010; 4 pages.

Office Action dated Jan. 15, 2014; U.S. Appl. No. 12/893,552, filed Sep. 29, 2010; 7 pages.

Notice of Allowance and Fees Due dated May 13, 2014; U.S. Appl. No. 12/893,552, filed Sep. 29, 2010; 5 pages.

European Extended Search Report; Application No. 10182222.9; Mar. 24, 2011; 6 pages.

Canadian Office Action; Application No. 2,754,229; Sep. 30, 2013; 2 pages.

Find your iPhone or iPad; http://www.apple.com/mobileme/features/find-my-iphone.html; Apr. 10, 2010; 3 pages.

iHound Tracker for iPhones, iPads & Families; iOS Universal; http://appshopper.com/utilities/ihound; Feb. 14, 2009; 2 pages.

Find My Cell Phone; http://www.whynot.net/ideas/2217; Oct. 11, 2005; 3 pages.

\* cited by examiner

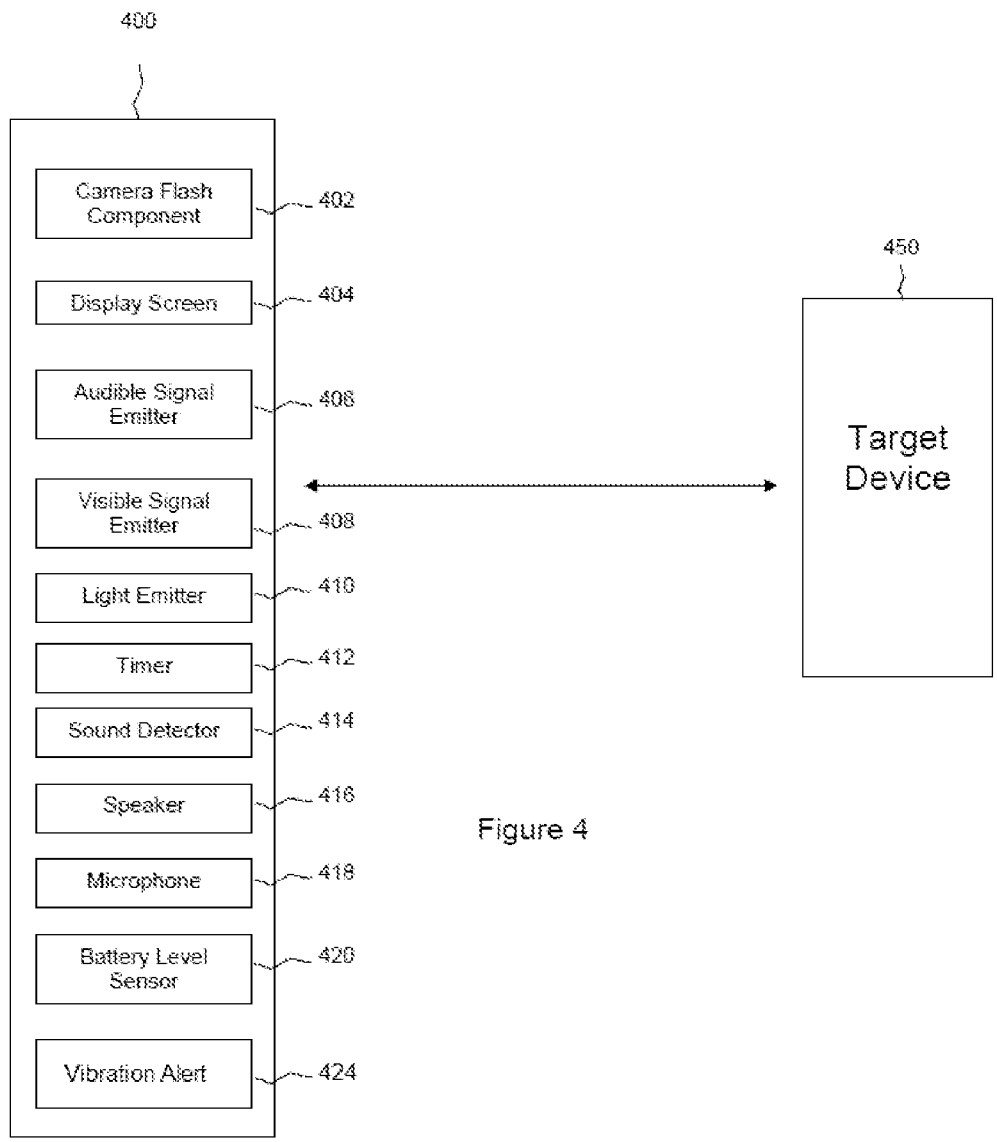

SYSTEMS AND METHODS FOR MANAGING LOST DEVICES

CROSS-REFERENCE TO RELATED APPLICATIONS

This application is a continuation of U.S. patent application Ser. No. 12/893,552 filed Sep. 29, 2010 by Daniel Richard L. Brown entitled, "Systems and Methods for Managing Lost Devices", now U.S. Pat. No. 8,836,510 issued on Sep. 16, 2014, which is incorporated by reference herein as if reproduced in its entirety.

BACKGROUND

As used herein, the terms "device", "electronic device", and the like can refer to mobile equipment such as telephones, smart phones, personal digital assistants, handheld or laptop computers, and similar devices that have telecommunications capabilities and that are easily transportable. Such a device might include an associated removable memory module, such as but not limited to a Universal Integrated Circuit Card (UICC) that includes a Subscriber Identity Module (SIM) application, a Universal Subscriber Identity Module (USIM) application, or a Removable User Identity Module (R-UIM) application.

The portability of many electronic devices can be convenient for the user but can also make the devices prone to loss or misplacement. As used herein, the term "lost" might refer to a state of a device wherein the device owner is unaware of the device's current location or wherein the device is otherwise out of the owner's immediate physical contact. As used herein, the term "owner" might refer to any individual or entity that is capable of controlling the functions on a device.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 4 illustrates a device according to an embodiment of the disclosure.

DETAILED DESCRIPTION

Figure 1:
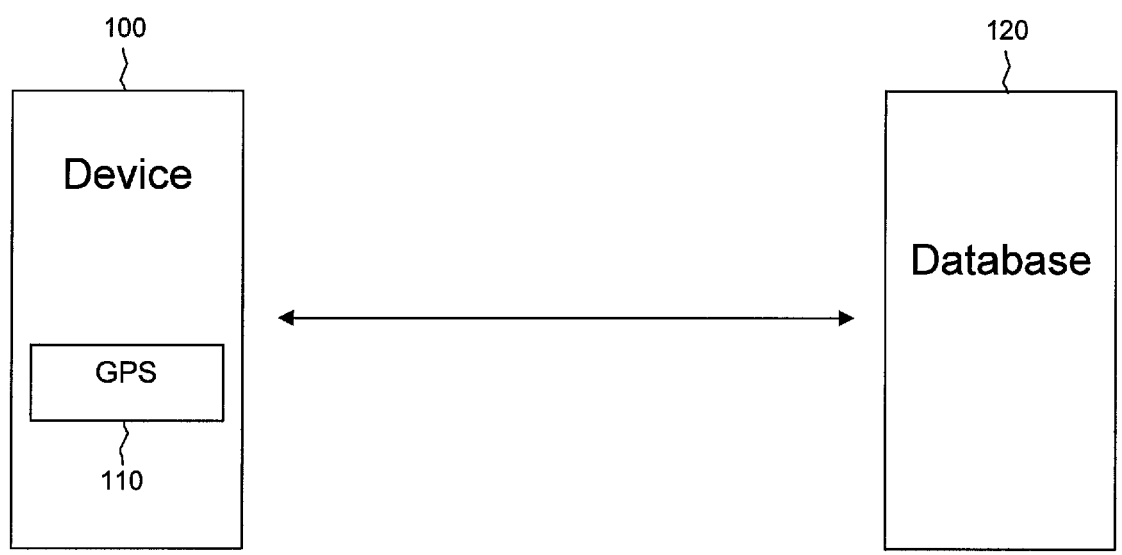
FIG. 1 illustrates a device that is capable of determining that it is lost, according to an embodiment of the disclosure.

It should be understood at the outset that although illustrative implementations of one or more embodiments of the present disclosure are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

The embodiments disclosed herein provide systems and methods for managing lost devices. Some embodiments deal with actions that are taken by a device when it learns that it has been lost. In some cases, the device takes the actions after receiving an input from the device owner indicating that the device has been lost. In other cases, the device takes the actions after determining on its own, without any input from the owner, that it is likely to have been lost. Other embodiments deal with techniques that a device might use to determine on its own that it is likely to have been lost. The embodiments described herein might be used independently of one another or in various combinations with one another.

When a device has been lost, it may be beneficial for the device to provide an alert that indicates the device's location to people who happen to be nearby. When such an alert makes someone aware of the presence of a lost device, that person might take appropriate steps to return the device to its owner. In an embodiment, when a device owner becomes aware that a device has been lost, the owner can send a message to the device to cause the device to produce such an alert. The message might be sent from another device and might be a text message, an email message, a voice message, or some other type of message. The owner might contact the telecommunications service provider associated with the device and the telecommunications service provider might send such a message to the device indicating the device is lost.

In various embodiments, after receiving such a message from the owner, a device produces a visible and/or audible alert. In one alternative, the device includes a camera, and a periodic activation of the flash component on the device's camera serves as a visible alert of the device's presence. In another alternative, a periodic turning on and turning off of the display screen on the device serve as a visible alert of the device's presence.

In another embodiment, a device is capable of detecting when it is in a WiFi hotspot or a similar area where a wireless internet connection is available. When the device receives a message from its owner indicating that it has been lost, the device determines whether it is in such an area. If the device detects that it is in such an area, the device sends a message, such as a text message, an email message, a voice message, or some other type of message, to another device that is known to belong to, or be associated with, or presumed to be viewable or monitored by a person of authority in the area. Another device such as this might be referred to as a target device for the specified location. The person of authority might then take appropriate steps to return the device to the owner. Sending the message to a target device for the specified location might allow a person in authority to find the device before the device is found by chance by some other person who may be more likely to keep the device than to return the device to its owner.

As an example, a device may be inadvertently left behind at a café that provides a wireless hotspot to its customers. Upon noticing that the device is missing, the device owner could send a message to the device informing the device that the device has been lost. Upon receiving the message, the device would attempt to detect whether it is in an area having a wireless hotspot. Upon determining that it is in a hotspot, the device would send a message to a target device associated with the manager of the café or with some other person with responsibility for the café or the café's hotspot. The message received by the target device could inform the person of authority that a lost device is on the premises of the café. The person of authority might then search the premises for the device. The device might assist the search by producing one or more of the other alerts described herein to draw attention to itself.

In another embodiment, after being notified by its owner that it has been lost, a device might produce a visible and/or audible alert when it determines that it is moving. That is, the device might be equipped with a Global Positioning System (GPS) or use other known systems or techniques capable of detecting the location of the device. Alternatively or additionally, the device might include an accelerometer or camera, for example, that is able to detect movement of the device. An indication from the GPS or accelerometer that the device is changing its location might be an indication that someone is deliberately or inadvertently moving the lost device. If a person deliberately moving the device receives a visible and/or audible alert from the device upon moving the device, the person might be motivated to return the device to the owner. If a person unknowingly moving the device receives a visible and/or audible alert from the device upon moving the device, the person might become aware of the device and might be less likely to cause the device to become irretrievably lost.

As an example, a device that has been left behind in an office building might accidentally end up in a trash bin and might remain in the trash bin for an extended time without anyone being aware of its presence. When a member of a cleaning crew empties the trash bin, the movement of the device, as detected by the GPS, the accelerometer, or some other system, might produce a visible and/or audible alert that makes the cleaner aware of the device's presence. The cleaner might then take appropriate steps to return the device to the owner. Without such an alert, the device might be inadvertently transferred into a large-scale garbage disposal system where it may be unlikely to ever be found.

As another example, a device might be lost in a public location for an extended time without being noticed. If the device owner has notified the device that it has been lost, and the alerting techniques that the device has employed in response to this notification have failed to call anyone's attention to the device, the alerting techniques might be discontinued. However, an indication from the device's GPS or accelerometer that the device is moving might be an indication that someone has found the device. If a visible and/or audible alert is generated at that time, the finder of the device might be prompted to attempt to return the device to the owner. A visible and/or audible alert that is generated at that time might also be noticed by other people who happen to be in the vicinity of the finder, and their awareness of the lost device might encourage the finder to return the device rather than keep it.

Alternatively or additionally, in such a situation where the alerting techniques are not currently active, an alert could be produced when a device detects an input into the device. For example, a visible and/or audible alert could be generated when a device detects a press of a button or the touch screen on the device or when the microphone on the device detects a sound.

In addition to being capable of receiving notifications from its owner that it has been lost, a device might be capable of determining on its own, using any of the techniques that will be described in detail below, that it is likely to have been lost. When a device determines without input from its owner that it is lost, the device might take any of the actions described above with regard to the device being informed that it has been lost. That is, the device might activate the camera flash, might cause the display screen to flash, might send a message to a target device associated with a person of authority in a hotspot after determining that it is in the hotspot, or might emit a visible and/or audible signal upon detecting that it is moving or upon detecting an input.

Alternatively or additionally, there are other alerts that a device might produce when it determines on its own that it is lost. In an embodiment, a device that has determined that it is lost might display a message on its display screen to indicate that it is lost. In another embodiment, a device that has determined that it is lost might emit an audible sound to indicate that it is lost. In another embodiment, a device that has determined that it is lost might relay a voice message through the speaker on its telephone. The voice message might be a pre-recorded statement that the device is lost or might be a live message that is transmitted to the device by its owner or by a third party.

In addition to or as an alternative to a device taking one or more of the above actions upon determining itself to be lost, the device could also attempt to notify the owner of its potential lost state. This could include a notification to an individual user through an alternative contact mechanism. Alternatively or additionally, this could include a notification to an enterprise organization through some central database, or perhaps notification to some other authority such as a carrier.

As mentioned above, a device might use one or more of several different techniques to determine that it is likely to have become lost. In one embodiment, the device might have access to a data store that stores information related to locations in which the device is likely to be present and/or locations in which the device is not likely to be present. The device can use a GPS-type system to determine the location in which it is currently present. The device can compare its current location with the locations in the data store, and if its current location is not a location in which it is likely to be present or if its current location is a location in which it is not likely to be present, then the device considers itself to be lost.

As an example, a device owner might designate several locations, such as the owner's home and office, in or near which the device is likely to be present. The owner may then store the GPS coordinates or some other identifying information for such locations in a database to which the device has access. If the device determines that, for a pre-specified period of time, its location has not been one of these designated locations, the device could determine that it is lost.

Additionally or alternatively, the device owner might designate several locations in or near which the device is not likely to be present. Such locations might include countries, cities, neighborhoods, streets, buildings, or other public or private places where the owner is unlikely to take the device. The owner may then store the GPS coordinates or other identifying information for these locations in the database. If the device determines that it is in one of these locations, the device could determine that it is lost. In other embodiments, the data store of locations in which the device is likely and/or unlikely to be present might be populated in other ways. Alternatively, the device itself might keep track of the locations that it frequents and record these locations for analysis. The location, length of time spent at these locations, and other information might be maintained and analyzed by the device when attempting to determine whether the device has been lost.

In another embodiment, a device can use a GPS-type system to determine that it has not moved for an extended period of time. Since many device owners tend to carry their devices with them, a lack of movement of a device might provide an initial indication that the device is lost. However, a lack of movement may not be sufficient to establish that a device is lost, since the device might not move while the owner is sleeping, while the owner is at work, or in other circumstances. In an embodiment, when a device determines that it has not moved for a pre-specified period of time, the device compares its current location with a set of locations where the device might be expected to not move for an extended time. Such locations might be specified by GPS coordinates or in some other manner. If the device determines that it has not moved for a time longer than the pre-specified time, and if the device then determines that it is not in a location where such a lack of movement could be expected, then the device considers itself to be lost.

In another embodiment, the microphone for the voice calling component on a device can determine that no significant levels of sound have been detected for an extended period of time. Such a lack of sound may indicate that the device is in an unoccupied area, and being in an unoccupied location for an extended time might provide an initial indication that the device is lost. However, being in an unoccupied location may not be sufficient to establish that a device is lost, since the device might be in an unoccupied location while the owner is in a nearby room or in other circumstances where the device is not actually lost. In an embodiment, when a device determines by a lack of detected sound that it is in an unoccupied location, the device compares its current location with a set of potentially unoccupied locations where the device might be expected to be located. Such locations might be specified by GPS coordinates or in some other manner. If the device determines that it has not detected significant levels of sound for a time longer than a pre-specified time, and if the device then determines that it is not in a location where such a lack of sound could be expected, then the device considers itself to be lost.

In another embodiment, the microphone for the voice calling component on a device can transmit sounds that the microphone detects to a sound recognition component on the device or otherwise available to the device. The sound recognition component might be able to distinguish between sounds that the device is likely to detect and sounds that the device is not likely to detect. Sounds that the device is likely to detect might include typical office sounds or other sounds typically heard in the owner's workplace or home. Sounds that the device is not likely to detect might include sounds typically heard in workplaces other than the owner's workplace and sounds typically heard in other places that the owner is unlikely to visit. In an embodiment, if an extended period of time passes during which the device does not detect a sound that the device is likely to detect, then the device considers itself to be lost. Alternatively or additionally, if the device does detect a sound that the device is not likely to detect, then the device considers itself to be lost.

In any of the above embodiments, the type of alert that is activated when a device is notified that it has been lost or determines on its own that it is lost can depend on the environment in which the device is located. For example, when the device determines that it is in a dark environment, a flashing of light may be an appropriate way for a lost device to call attention to itself, and in a quiet environment, an audible signal may be an appropriate way for a lost device to call attention to itself. In an embodiment, a device includes appropriate components for determining the characteristics of the environment in which the device is present. For example, the photography-related components on the device might be capable of measuring the light levels in the device's location, and the voice call-related components on the device might be capable of measuring the sound levels in the device's location. In an embodiment, if a lost device determines that it is in a location with a light level below a pre-specified value, the device causes the camera flash to be repeatedly activated and/or causes its display screen to repeatedly flash. Alternatively or additionally, if a lost device determines that it is in a location with a sound level below a pre-specified value, the device emits an audible signal or might vibrate.

In any of the above described embodiments, a device could take more than one of the described actions when the device is notified that it has been lost or determines on its own that it is lost. In an embodiment, the actions that the device takes occur in a pre-specified sequence, and the sequence might be based on how noticeable the actions are. For example, a relatively less noticeable action, such as the display of a message on the device's display screen, might be taken first, and increasingly more noticeable actions, such as the flashing of lights or the emitting of sounds, might then be sequentially taken.

Alternatively or additionally, an action that the device takes as an alert that it has been lost could be based on the device's available battery power. For example, repeated activation of the flash for the device's camera might deplete the battery and thus might be undesirable to do for an extended period of time. In an embodiment, an alert is stopped or is not started when the device's available battery power is below a pre-specified level. If an alert is stopped because of a low battery, the device could then switch to a less power-consuming alert or could stop producing any alert at all.

FIG. 1 illustrates an embodiment of a device 100 capable of determining that it is lost. The device 100 includes or has access to a GPS system 110 or other systems that can determine the location of the device 100. The device also has access to a database 120 or other data storage component that stores information about locations where the device 100 is likely to be present and/or locations where the device 100 is not likely to be present. While the database 120 is depicted as a separate component from the device 100, the database 120 could be a component within the device 100. The device 100 can compare its current location as determined by the GPS 110 with the locations in the database 120, and if its current location is not a location where it is likely to be present or if its current location is a location where it is not likely to be present, then the device 100 considers itself to be lost.

Figure 2:
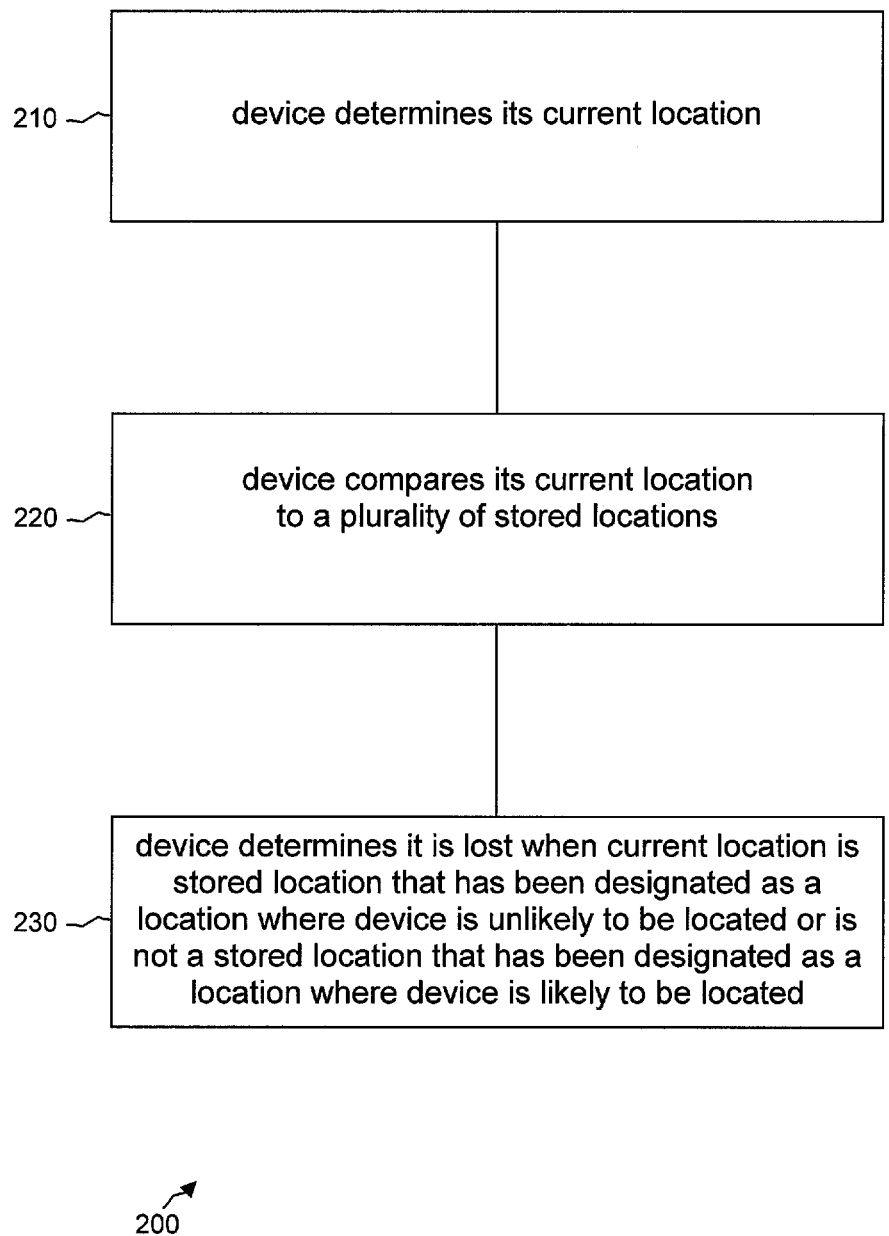
FIG. 2 is a flowchart for a method for a device to determine that it is lost, according to an embodiment of the disclosure.

FIG. 2 illustrates an embodiment of a method 200 for a device to determine that it is lost. At block 210, the device determines its current location. At block 220, the device compares its current location to a plurality of stored locations. At block 230, the device determines that it is lost when its current location is a stored location that has been designated as a location where the device is unlikely to be located or when its current location is not a stored location that has been designated as a location where the device is likely to be located.

Figure 3:
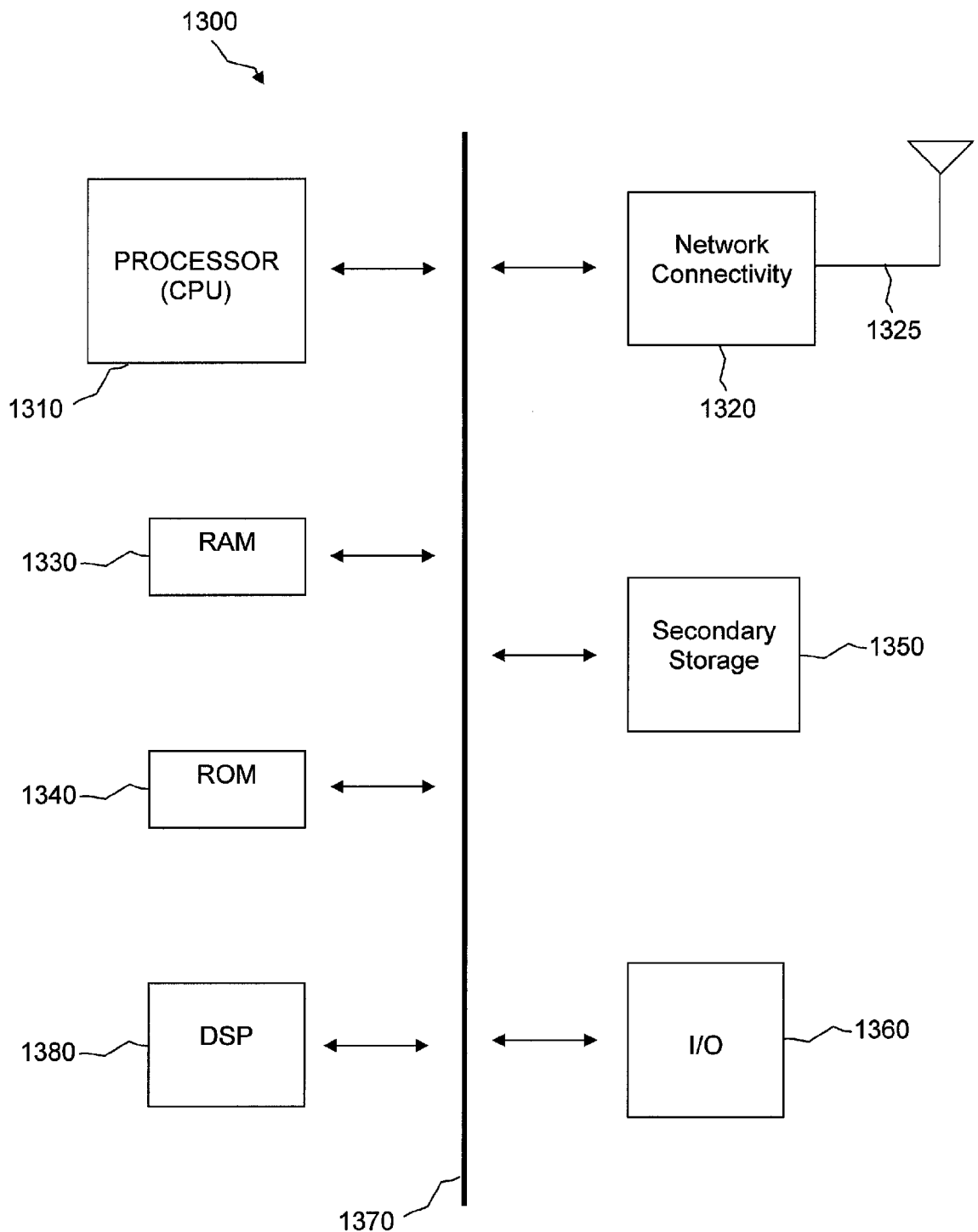
FIG. 3 illustrates a processor and related components suitable for implementing the several embodiments of the present disclosure.

The device 100 of FIG. 1 might include a processing component that is capable of executing instructions related to the actions described above. FIG. 3 illustrates an example of a system 1300 that includes a processing component 1310 suitable for implementing one or more embodiments disclosed herein. In addition to the processor 1310 (which may be referred to as a central processor unit or CPU), the system 1300 might include network connectivity devices 1320, random access memory (RAM) 1330, read only memory (ROM) 1340, secondary storage 1350, and input/output (I/O) devices 1360. These components might communicate with one another via a bus 1370. In some cases, some of these components may not be present or may be combined in various combinations with one another or with other components not shown. These components might be located in a single physical entity or in more than one physical entity. Any actions described herein as being taken by the processor 1310 might be taken by the processor 1310 alone or by the processor 1310 in conjunction with one or more components shown or not shown in the drawing, such as a digital signal processor (DSP)

1380. Although the DSP 1380 is shown as a separate component, the DSP 1380 might be incorporated into the processor 1310.

The processor 1310 executes instructions, codes, computer programs, or scripts that it might access from the network connectivity devices 1320, RAM 1330, ROM 1340, or secondary storage 1350 (which might include various disk-based systems such as hard disk, floppy disk, or optical disk). While only one CPU 1310 is shown, multiple processors may be present. Thus, while instructions may be discussed as being executed by a processor, the instructions may be executed simultaneously, serially, or otherwise by one or multiple processors. The processor 1310 may be implemented as one or more CPU chips.

The network connectivity devices 1320 may take the form of modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) devices, global system for mobile communications (GSM) radio transceiver devices, worldwide interoperability for microwave access (WiMAX) devices, digital subscriber line (xDSL) devices, data over cable service interface specification (DOCSIS) modems, and/or other well-known devices for connecting to networks. These network connectivity devices 1320 may enable the processor 1310 to communicate with the Internet or one or more telecommunications networks or other networks from which the processor 1310 might receive information or to which the processor 1310 might output information.

The network connectivity devices 1320 might also include one or more transceiver components 1325 capable of transmitting and/or receiving data wirelessly in the form of electromagnetic waves, such as radio frequency signals or microwave frequency signals. Alternatively, the data may propagate in or on the surface of electrical conductors, in coaxial cables, in waveguides, in optical media such as optical fiber, or in other media. The transceiver component 1325 might include separate receiving and transmitting units or a single transceiver. Information transmitted or received by the transceiver component 1325 may include data that has been processed by the processor 1310 or instructions that are to be executed by processor 1310. Such information may be received from and outputted to a network in the form, for example, of a computer data baseband signal or signal embodied in a carrier wave. The data may be ordered according to different sequences as may be desirable for either processing or generating the data or transmitting or receiving the data. The baseband signal, the signal embedded in the carrier wave, or other types of signals currently used or hereafter developed may be referred to as the transmission medium and may be generated according to several methods well known to one skilled in the art.

The RAM 1330 might be used to store volatile data and perhaps to store instructions that are executed by the processor 1310. The ROM 1340 is a non-volatile memory device that typically has a smaller memory capacity than the memory capacity of the secondary storage 1350. ROM 1340 might be used to store instructions and perhaps data that are read during execution of the instructions. Access to both RAM 1330 and ROM 1340 is typically faster than to secondary storage 1350. The secondary storage 1350 is typically comprised of one or more disk drives or tape drives and might be used for non-volatile storage of data or as an over-flow data storage device if RAM 1330 is not large enough to hold all working data. Secondary storage 1350 may be used to store programs that are loaded into RAM 1330 when such programs are selected for execution.

The I/O devices 1360 may include liquid crystal displays (LCDs), touch screen displays, keyboards, keypads, switches, dials, mice, track balls, voice recognizers, card readers, paper tape readers, printers, video monitors, or other well-known input/output devices. Also, the transceiver 1325 might be considered to be a component of the I/O devices 1360 instead of or in addition to being a component of the network connectivity devices 1320.

In an embodiment, a device 400 such as shown in FIG. 4 is provided. The device 400 comprises a component configured such that when the device learns that the device has been lost, the device produces at least one alert that includes at least one of: a flashing of a camera flash component 402 on the device; a flashing of a display screen 404 on the device; upon the device detecting that the device is in a location with a wireless internet connection, a transmission of a message to a target device 450 associated with the detected location; and upon the device detecting that the device has moved, an emission of a visible or audible signal. The device 400 may utilize various components to implement this and/or other embodiments disclosed herein, such as but not limited to an audible signal emitter 406, visible signal emitter 408, light emitter 410, timer 412, sound detector 414, speaker 416, microphone 418, battery level sensor 420, and a vibration alert 424.

In another embodiment, a method for a device to determine that it has been lost is provided. The method comprises the device determining its current location, the device comparing its current location to a plurality of stored locations, and the device determining that it has been lost when its current location is a stored location that has been designated as a location where the device is unlikely to be located or is not a stored location that has been designated as a location where the device is likely to be located.

In another embodiment, a device is provided. The device comprises a component configured such that the device emits light intermittently when the device learns that the device has been lost.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

A device, comprising a camera comprising a flash component; and a component configured such that in response to the device determining that the device has been lost, the device produces at least one alert that includes a flashing of the flash component on the device, wherein the device produces the flashing of the flash component without causing the camera to obtain an image, wherein when the device detects that the device is in a location with a sound level below a value, the device activates a vibration alert (e.g., the vibration alert 424 of FIG. 4), and wherein activating the vibration alert comprises periodically causing the device to vibrate.

What is claimed is:

1. A device, comprising:
 a camera comprising a flash component; and
 a component configured such that in response to the device determining that the device has been lost, the device produces at least one alert that includes a flashing of the flash component on the device, wherein the device produces the flashing of the flash component without causing the camera to obtain an image.

2. The device of claim 1, wherein the component is further configured such that when the device detects that the device is in a first location with a light level below a first value, the device activates the at least one alert, and when the device detects that the device is in a location with a sound level below a second value, the device activates a vibration alert.

3. The device of claim 2, wherein activating the flash component comprises periodically causing the flash component or a display screen of the device to flash, and wherein activating the vibration alert comprises periodically causing the device to vibrate.

4. The device of claim 2, wherein the device deactivates the at least one alert or the vibration alert in response to one of:
 the device determining that a battery level of the device is below a level, or
 the device failing to detect that the device has been found within a duration.

5. The device of claim 4, wherein, when the device deactivates the at least one alert or the vibration alert, the device reactivates the at least one alert or the vibration alert in response to detecting at least one of:
 a press of a button on the device;
 a physical input via a touch screen display of the device;
 a sound; or
 movement of the device.

6. The device of claim 5, wherein the device produces at least one further alert when the device reactivates the at least one alert or the vibration alert, the at least one further alert including at least one of:
 a display of a message on a display screen of the device, the message indicating that the device is lost; and
 a pre-recorded voice message through a speaker on the device, the pre-recorded message indicating that the device is lost.

7. The device of claim 1, wherein the device determines the device has been lost by at least one of:
 the device determining that the device has not moved for a period of time, and determining that the device is not in a first location where a lack of movement of the device is considered likely;
 the device determining by a lack of detected sound that the device is in an unoccupied location, and determining that the device is not in a second location that is considered likely to be unoccupied;
 the device detecting a sound associated with a third location where the device is unlikely to be located; or
 the device failing for a length of time to detect a sound associated with a fourth location where the device is likely to be located.

8. A method implemented in a device, the method comprising:
 determining that the device has been lost; and
 producing at least one alert in response to determining that the device has been lost, the at least one alert including a flashing by a flash component of a camera on the device, wherein the device produces the flashing of the flash component without causing the camera to obtain an image.

9. The method of claim 8, further comprising activating the at least one alert upon detecting that the device is in a first location with a light level below a first value, and activating a vibration alert upon detecting that the device is in a location with a sound level below a second value.

10. The method of claim 9, wherein activating the at least one alert comprises periodically causing one of the flash component or a display screen of the device to flash, and wherein activating the vibration alert comprises periodically causing the device to vibrate.

11. The method of claim 10, wherein the device deactivates the at least one alert or the vibration alert in response to at least one of:
 determining that a battery level of the device is below a level, or
 failing to detect that the device has been found within a duration.

12. The method of claim 11, wherein, when the device deactivates the at least one alert or the vibration alert, the device reactivates the at least one alert or the vibration alert in response to detecting at least one of:
 a press of a button on the device;
 a physical input via a touch screen display of the device;
 a sound; or
 movement of the device.

13. The method of claim 12, further comprising producing at least one further alert when reactivating the at least one alert or the vibration alert, wherein producing the at least one further alert includes at least one of:
 displaying a message on the display screen of the device, the message indicating that the device is lost; or
 outputting a pre-recorded voice message through a speaker on the device, the pre-recorded message indicating that the device is lost.

14. The method of claim 8, wherein determining that the device has been lost comprises at least one of:
 determining that the device has not moved for a period of time, and determining that the device is not in a first location where a lack of movement of the device is considered likely;
 determining by a lack of detected sound that the device is in an unoccupied location, and determining that the device is not in a second location that is considered likely to be unoccupied;
 detecting a sound associated with a third location where the device is unlikely to be located; or
 failing for a length of time to detect a sound associated with a fourth location where the device is likely to be located.

15. A non-transitory computer readable medium storing instructions executable by a processor to implement a method in a device, the method comprising:
 determining that the device has been lost; and
 producing at least one alert in response to determining that the device has been lost, the at least one alert including a flashing by a flash component of a camera on the device, wherein the device produces the flashing of the flash component without causing the camera to obtain an image.

16. The non-transitory computer readable medium of claim 15, wherein the method further comprises activating an at least one alert upon detecting that the device is in a first location with a light level below a first value, and activating a vibration alert upon detecting that the device is in a location with a sound level below a second value.

17. The non-transitory computer readable medium of claim 16, wherein activating the at least one alert causes at least one of the flash component or a display screen of the device to periodically flash, and wherein activating the vibration alert causes the device to vibrate.

18. The non-transitory computer readable medium of claim 17, wherein the method further comprises deactivating the at least one alert or the vibration alert in response to at least one of:
   determining that a battery level of the device is below a level, or
   failing to detect that the device has been found within a duration.

19. The non-transitory computer readable medium of claim 18, wherein, when the device deactivates the at least one alert or the vibration alert, the device reactivates the at least one alert or the vibration alert in response to detecting at least one of:
   a press of a button on the device;
   a physical input via a touch screen display of the device;
   a sound; or
   movement of the device.

20. The non-transitory computer readable medium of claim 15, wherein determining that the device has been lost comprises at least one of:
   determining that the device has not moved for a period of time, and determining that the device is not in a first location where a lack of movement of the device is considered likely;
   determining by a lack of detected sound that the device is in an unoccupied location, and determining that the device is not in a second location that is considered likely to be unoccupied;
   detecting a sound associated with a third location where the device is unlikely to be located; and
failing for a length of time to detect a sound associated with a fourth location where the device is likely to be located.

* * * * *